United States Patent [19]
Binder

[11] 3,819,967
[45] June 25, 1974

[54] ADHESIVELY BONDED COMMUTATOR

[75] Inventor: John Frank Binder, Burnt Hills, N.Y.

[73] Assignee: General Electric Company, Lynn, Mass.

[22] Filed: Mar. 1, 1972

[21] Appl. No.: 230,676

Related U.S. Application Data

[63] Continuation-in-part of Ser. No. 77,130, Oct. 1, 1970, abandoned.

[52] U.S. Cl. .................................. 310/236, 310/45
[51] Int. Cl. ........................................... H02k 13/04
[58] Field of Search .......... 310/233, 219, 234, 232, 310/235, 43, 236, 45; 29/597; 260/46.5

[56] References Cited
UNITED STATES PATENTS

| | | | |
|---|---|---|---|
| 1,401,708 | 12/1921 | Kempton | 310/236 |
| 2,645,732 | 7/1953 | Marsal | 310/234 |
| 2,956,191 | 10/1960 | Schafer | 310/235 |
| 3,103,060 | 9/1963 | Fay | 29/597 |
| 3,290,527 | 12/1966 | Habermann | 310/236 |
| 3,325,450 | 6/1967 | Holub | 260/46.5 |
| 3,473,063 | 10/1969 | Forste | 310/235 |

*Primary Examiner*—R. Skudy

[57] ABSTRACT

A commutator in which a base member having an outer cylindrical surface has metallic, electrically conductive commutating segments adhesively bonded to the cylindrical surface by a relatively thin layer of an adhesive material which is electrically non-conductive and has high dielectric strength. The base member is formed of a material characterized by extreme rigidity and thermal stability relative to the adhesive material, and the diameter of the base member is at least one hundred times greater than the thickness of the adhesive layer. The adhesive material is preferably selected from the group of adhesives consisting of epoxies and polyimides.

17 Claims, 5 Drawing Figures

ADHESIVELY BONDED COMMUTATOR

BACKGROUND OF THE INVENTION

RELATED APPLICATIONS

This application is a continuation-in-part of copending application Ser. No. 77,130, for "Adhesively Bonded Commutator," filed Oct. 1, 1970, in the name of John F. Binder and assigned to the assignee of this application.

FIELD OF THE INVENTION

This invention relates to commutators for use in dynamoelectric machines of the industrial type and, more particularly, to adhesively bonded commutators characterized by high rigidity and thermal stability during operation.

DESCRIPTION OF THE PRIOR ART

D-C motors and generators of the industrial type include as an important component thereof a cylindrical rotating commutator having a plurality of spaced-apart commutating segments on the outer periphery thereof. Since in an industrial type machine each commutating segment must be capable of conducting substantial amounts of electrical current, the commutating segments have substantial mass and, as a result, are subject to substantial centrifugal forces during normal operation. These centrifugal forces must obviously be resisted in order to maintain the integrity of the structure. It is not, however, sufficient that the commutator merely be held together mechanically during operation; it is also essential that the structure exhibit a high degree of mechanical and thermal stability throughout the entire operating range. It has been found that mechanical and thermal instability resulting from uneven heating, rapid acceleration and deceleration, and the like can result in heavy, intolerable sparking and excessive wear and damage to not only the commutator, but also other machine components such as the brushes in contact with the commutator.

Heretofore, various forms of mechanical restraining means have been used to maintain not only the structural integrity of commutator assemblies, but also a high degree of stability during operation. It has been common to provide a relatively massive base member of steel or other material characterized by substantial rigidity and thermal stability and to secure commutating segments thereto by means such as shrunken rings, glass bands or by mating shoulders or dovetails on the segments and the base member. Another less generally used form of mechanical retaining means is made by molding the commutator base with the commutation segments imbedded therein. In commutators of this type, the commutation segments generally include an expanded base portion or shoulder to facilitate restraint of movement of the segments by the base member in which it is imbedded.

These prior art mechanically bound commutator assemblies share certain serious disadvantages. First, the mechanical design of the commutation segments, to provide for the mechanical restraining means, requires that the segments have substantial radial length and be relatively complex in shape. In fact, a trapezoidal cross section is generally required in order to provide adequate width on the outer surface of the segments and adequate spacing between segments at their inner end. The cost of these segments is therefore substantial. Secondly, it has heretofore been difficult to assemble commutating segments of complex form into an integral commutator. The usual practice with prior art commutators has been to individually place each commutating segment by hand and to utilize hand inserted mica spacers or the like to establish the proper spacing between adjacent segments. This means of assembly has heretofore added significantly to the overall cost of manufacturing commutators for industrial type dynamoelectric machines.

SUMMARY OF THE INVENTION

It is therefore an object of this invention to provide an improved commutator for dynamoelectric machines of the industrial type.

Another object of this invention is to provide an industrial type commutator having both uncomplicated and relatively easy to assemble components and a high degree of mechanical and thermal stability during operation.

Yet another object is to provide a relatively inexpensive commutator having a high degree of mechanical and thermal stability when operated in a dynamoelectric machine of the industrial type.

Briefly stated, in carrying out the invention in one form, a base member having a cylindrical outer surface has a plurality of electrically conductive commutating segments bonded thereto by a layer of high temperature resistant adhesive material, the adhesive material being electrically non-conductive and having high dielectric strength. In accordance with the invention, the base member is formed of a material, such as steel, having extreme rigidity and thermal stability relative to the adhesive material, which is preferably selected from the group of adhesives consisting of epoxies and polyimides. Furthermore, the diameter of the base member is at least one hundred times greater than the thickness of the adhesive layer such that the integral bonded commutator substantially exhibits during operation the mechanical and thermal stability characteristics of the base member. By a further aspect of the invention, the diameter of the base member is at least 2.000 inches and the thickness of the adhesive layer is in the range of 0.020 inch or less. By still further aspects of the invention, spacing means are provided for maintaining a predetermined minimum thickness of the adhesive layer and specific preferred epoxy and polyimide adhesive resins are utilized as the bonding agent.

BRIEF DESCRIPTION OF THE DRAWINGS

This invention may be better understood by reference to the following detailed description taken in conjunction with the accompanying drawings in which.

DETAILED DESCRIPTION

Figure 1:
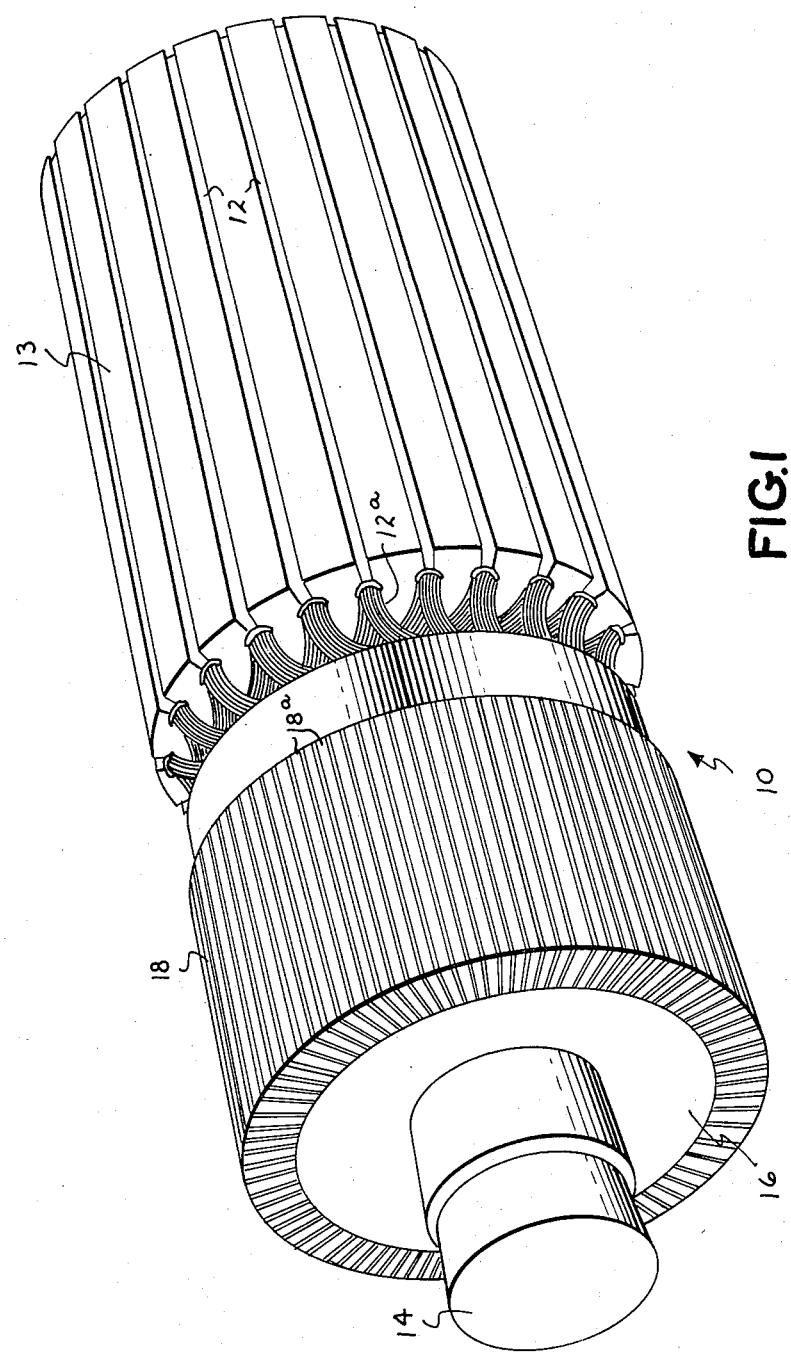
FIG. 1 is a perspective view of an armature for a typical industrial-type dynamoelectric machine incorporating a commutator of the present invention.

Referring first to FIG. 1, there is shown an armature assembly 10 for an industrial-type dynamoelectric machine, including specifically armature coils 12, armature shaft 14 and a commutator assembly which includes a base member 16 and elongated commutating segments 18 mounted thereon. The axially inner ends of segments 18a are in electrical contact with armature coils 12 through lead wires 12a.

Figure 2:
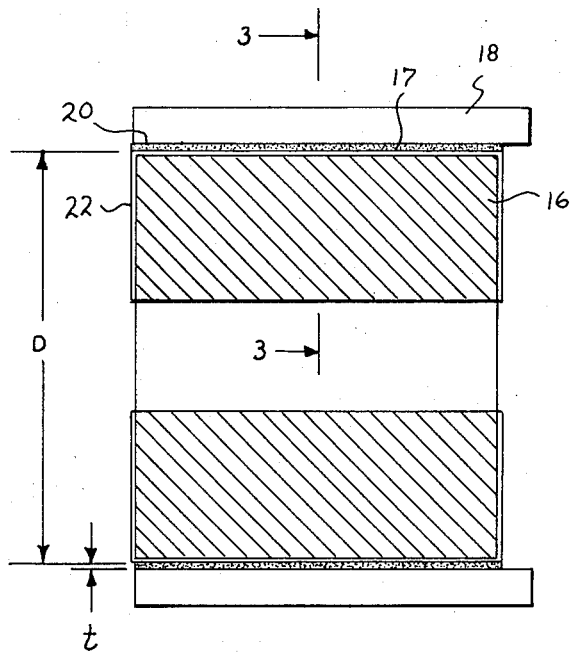
FIG. 2 is a longitudinal cross sectional view of the commutator shown in FIG. 1.
Figure 3:
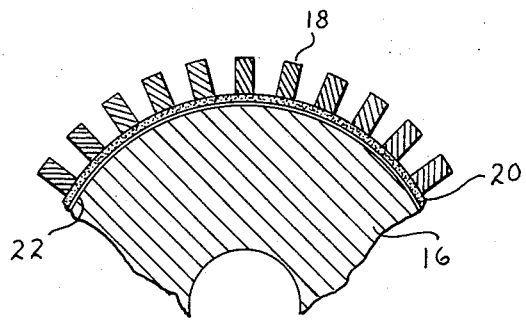
FIG. 3 is a partial cross sectional view of the commutator taken along viewing line 3—3 of FIG. 2.
Figure 4:
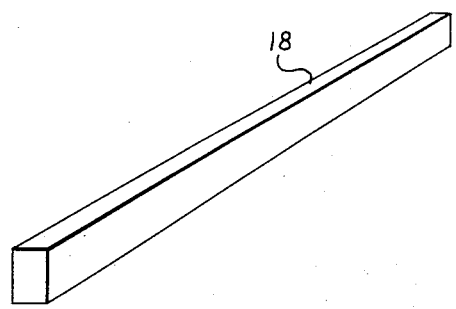
FIG. 4 is a perspective view of one of the commutator segments used in the commutator of this invention.

The commutator of FIG. 1 is seen in longitudinal and radial cross section in FIGS. 2 and 3, respectively, wherein there is shown the rotatable base member 16 having a cylindrical outer surface 17 and commutating segments 18 adhesively bonded to the surface 17 by a layer 20 of adhesive material. As best illustrated by FIG. 4, each of the segments 18 is of relatively simple shape with a rectangular cross section. This is in contrast to the complex shapes of the typical prior art commutating segments for industrial type machines. The commutator of this invention may be easily mass produced in that the commutating segments 18 may be simultaneously positioned and secured to the base member 16. A preferred assembly method, and preferred apparatus for carrying out the method, are disclosed and claimed by copending patent application Ser. No. 77,131 for "Method and Apparatus For Adhesively Bonded Commutators," filed on Oct. 1, 1970, in the name of Michael A. McGrath and assigned to the assignee of this invention.

In accordance with the invention, the base member 16 is made from a material characterized by extreme rigidity and thermal stability relative to that of the adhesive material forming the bonding layer 20. It has been found in practice that steel is a particular suitable material for the base member 16 in that it is extremely rigid relative to common adhesives and has a low coefficient of expansion, on the order of $3.5 \times 10^6$ in./in./°C, relative to suitable adhesives, which generally have coefficients of expansion in the range of $30 \times 10^6$ in./in./°C to $60 \times 10^6$ in./in./°C. Under suitable conditions, the base member 16 may be made of various metallic and non-metallic materials, or combinations thereof, depending on cost and mechanical stress and environmental conditions in the ultimate intended application. Those prepared from electrical conductive materials must of course be insulated from the commutator segment. In the case of metallic base members, steel, aluminum, cast iron, etc. may be used with an insulating covering or coating consisting of molded epoxy glass, molded polyimide glass, or plasma sprayed ceramic. A preferred embodiment is a steel base member having a plasma sprayed alumina outer coating 22 as illustrated by FIG. 2.

Generally, the base member 16 may be prepared for final assembly into the bonded commutator structure in various ways. For example, in the case of an organic or reinforced organic material, rolled tubing with an inside diameter slightly smaller than the shaft diameter and with an outside diameter slightly larger than the intended bonding surface diameter is selected and the outer surface is roughened by sandblasting or abrasion grinding. The tube is then cut to desired length and the commutator segments are bonded thereto. Alternatively, the organic material, with or without reinforcement, may be molded to the desired dimensions and the outer surface thereof roughened prior to bonding of the commutator segments.

A base member 16 of metal may be prepared, for example, by molding, turning, cutting, grinding, etc. Generally, the outer surface of the metallic base member is sand blasted or roughened in some way prior to the application of the insulating coating 22 thereto.

The commutating segments 18 used in the present invention may be made from rectangular or bevelled metal stock. Generally, they are made of copper or a copper alloy selected for specific properties, although aluminum and other metals may be used. When rectangular cross section stock is used, rounded or radiused edges are provided on the bonding surface thereof to minimize stress concentration at the outer limits of this bonding surface. If the segment is made of copper, generally it is degreased with solvent and then acid (bright) dipped prior to bonding the segment to the base member. In some cases, it may be desirable to have a thin layer of zinc diffused on the surface of the copper segment. Among other things, this may improve the bondability of the copper segments. Such a layer may be provided by degreasing with solvent, acid bright dipping, cyanide cleaning, plating the copper segments with zinc and then diffusing the zinc into the copper by heat treating it at 180°–250°C.

Depending on the assembly method used, the commutator segments may then be coated on their bonding surface with the adhesive to be used or delivered directly to the assembly apparatus. Alternatively, the adhesive may be applied to the copper segment in the assembly apparatus or it may be applied to the base member to which the segments are to be bonded. This may depend, among other things, on the design of the assembly apparatus and the assembly procedure used. Generally, if the base member is heated prior to the assembly, the adhesive is applied to the segment rather than to the base member to avoid premature activation. If ultrasonic vibration is used to provide activation energy, the adhesive may be applied to either the segment or the base member. Application of the adhesive to the segment is preferred in most cases.

The adhesive is generally applied as a viscous liquid and a roller, liquid dispenser, or spray form of application may be used. Such viscous liquid adhesive also includes a spacing filler, such as glass beads, to keep the adhesive from being squeezed out from between the segment and the mounting surface, thereby starving the bond interface of adhesive material. Alternatively, adhesives disposed in a sheet-type supply means can be applied by wrapping the sheet around the commutator shell. Hot melt adhesives may be applied by spray, electrostatic, or fluid bed techniques and combinations of these techniques can also be applied to hot melt adhesives. For more detailed consideration of appropriate bonding methods, attention is directed to the said copending application Ser. No. 77,131.

The details of the various adhesive compositions which may be used will be described below.

The adhesive used to provide the bonding layer in the commutator structure of the present invention must be capable of providing a high strength bond between a metallic segment and an organic or ceramic surface of a rotating base member. Further, the adhesive must be electrically non-conductive and have good dielectric strength. The former characteristic is necessary to avoid arc-over between commutation segments at the base thereof due to adhesive material around the commutation segments while the latter characteristic is necessary to avoid voltage-induced breakdown of the adhesive material due to voltage differentials between commutation segments and the rotating base element to which the segments are mounted. Further, it is desirable that the adhesive be capable of withstanding high temperatures since such temperatures are often encountered in larger d-c motors and generators. Of course, the adhesive must also have good aging characteristics.

While this invention is not limited to any particular adhesive or classes of adhesives, certain resin families, and particular examples thereof, have been found to be particularly effective in the commutator structures taught herein. These include, specifically, certain heat cured epoxies and polyimides. Such polyimides include those designated as FM34 and a siloxane imide. According to the American Cyanamid Company literature, FM34 is a polyimide adhesive supported by a glass carrier and containing a filler containing an arsenic compound. According to our analysis, the resinous portion is comprised of the reaction product on an aromatic dianhydride and aromatic diamine. The siloxane imide is described in U.S. Pat. No. 3,325,450.

Specific epoxies which have been found to be useful include (1) a diaminodiphenylsulfone-cured polyglycidol ether of tetraphenyl ethane including a fine aluminum powder filler, (2) a polyanhydride cured polyglycidol ether of bis-phenol A, and (3) a borontrifluoride monoethylamine and polyethylene glycol cured cycloaliphatic epoxy resin. The first of these, which is commercially available from the Goodyear Company as Plastilock 677, has been analyzed in our laboratories. According to our analysis, Plastilock 677 comprises approximately 55–60 percent of a material similar to Epon 1031 epoxy resin (Epon 1031 is the polyglycidyl ether of tetraphenylene ethane having an epoxide equivalent weight of 210 to 240 and is commercially available from the Shell Chemical Company), approximately 20 percent of a material similar to diaminodiphenylsulfone, approximately 1 percent of a Lewis acid type catalyst such as boron trifluoride monoethylamine and 20–25 percent of a fine aluminum powder. The second of the foregoing epoxies, which is commercially available as Eccobond 104 from Emerson & Cuming, Inc., was also analyzed in our laboratories. According to our analysis, it comprises approximately 50–55 percent of an epoxide such as Epon 828 epoxy resin (Epon 828 is the diglycidyl ether of bisphenol A having a viscosity of 10,000 to 16,000 centipoises at 25°C and having an epoxide equivalent weight of 185–192 and is commercially available from the Shell Chemical Company), 1.5–2.5 percent filler and 40–45 percent of pyromellitic dianhydride combined with certain fillers not included in the foregoing material concentration calculations.

In Table 1 below, there are listed several typical adhesives, together with their source and type, which have been tested in a bonded commutator assembly, as taught herein. These test assemblies had a radius 2.125 inches and a commutator segment weight of $1.64 \times 10^{-2}$ pounds.

TABLE 1

| Comm. No. | Adhesives (Commercial Designation) | Adhesive Chemical Type | Adhesive Source | Spin rpm | Test °C |
|---|---|---|---|---|---|
| 1 | DK4 Powder | Anhydride cured epoxide resin | Hysol Corporation | 6000 | 25 |
| 2 | Formula A | Cycloaliphatic epoxide resin | | 6000 | 25 |
| 3 | Formula B | Siloxane imide | U.S. Pat. No. 3,325,450 | 1600 | 25 |
| 4a | Formula C | Cycloaliphatic epoxide resin | | 6000 | 220 |
| 4b | Plastilock 677 | Amine cured, phenolic modified epoxide resin | Goodyear Company | 6000 | 220 |
| 4c | Eccobond 104 | Anhydride cured epoxide resin | Emerson & Cuming, Inc. | 6000 | 240 |
| 4d | Epon 958 | Filled epoxide resin | Shell Chemical Company | 6000 | 150 |
| 4e | Epon 951 | Amine Cured epoxide resin | Shell Chemical Company | 6000 | 150 |
| 4f | HT 424 | Amine cured phenolic epoxide resin | American Cyanamid Company | 6000 | 150 |
| 4g | Plastilock 677 | Amine cured epoxide resin | Goodyear Company | 6000 | 110 |
| 4h | FM34 | Polyimide | American Cyanamid Company | 6000 | 110 |

Adhesive formula A is comprised of 87 to 94 percent of a material similar to CY-179 which is an epoxy resin made by Ciba Chemical Company, 1 to 3 percent boron fluoride monoethylamine which is made by Allied Chemical Corporation, 2 to 6 percent Carbowax 400 which is made by Union Carbide Chemical Company and 1 to 4 percent pyrogenic colloidal silica which is made by Cabot Corporation. Adhesive formula C is similar to formula A except that the pyrogenic silica is excluded.

As indicated above, it is essential to the present invention that the commutator have a high degree of mechanical and thermal stability during operation. This is accomplished in large measure by forming the base member of a suitable material having these characteristics. In addition, however, the thickness $t$ of the adhesive layer 20 must be maintained within a predetermined range relative to the diameter $D$ of the base member 16. More particularly, it has been found in practice that the assembled commutator will substantially exhibit the mechanical and thermal stability characteristics of the base member 16 if the diameter $D$ is maintained at least one hundred times as great as the thickness $t$. If the thickness $t$ is permitted to become relatively greater, the greater flexibility and the higher coefficient of expansion of the adhesive material will cause the characteristics of the integral commutator to depart noticeably and considerably from the characteristics of the base member.

Figure 5:
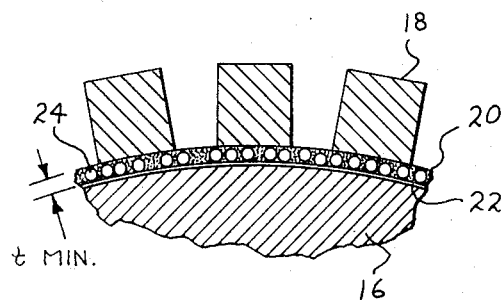
FIG. 5 is an enlarged view of a portion of the adhesive layer between the base member and two of the commutating segments.

Still more particularly, the commutating segments 18 should not be forced onto the cylindrical surface 17 of the base member 16 with sufficient force to squeeze the adhesive material from between the member. In other words, it has been found that a minimum thickness $T_{min}$ (FIG. 5) should be maintained. To assure that this minimum spacing is maintained, it is convenient to provide small glass beads 24 or other spacing means in the adhesive material to prevent the formation of a dry joint.

In most applications, it is desirable that the beads 24 have a diameter of approximately 0.003 inch. In other cases, however, it may be desirable to permit $t_{min}$ to be as small as 0.001 inch, or it may be desirable to maintain a larger minimum spacing. On the other hand, it has been found that the thickness of the layer of adhesive material should not exceed approximately 0.020 inch. Since the base member 16 will normally have a diameter $D$ of at least 2.000 inches, it will be seen that the desired relationship between $t$ and $D$ will be maintained even at the minimum diameter $D$ and the maximum thickness $t$.

In view of the foregoing, it will be seen that this invention provides an improved commutator for industrial type dynamoelectric machines which has a high degree of mechanical and thermal stability and is relatively easy and inexpensive to manufacture.

The foregoing is a description of illustrative embodiments of the invention, and it is applicant's intention in the appended claims to cover all forms which fall within the scope of the invention.

What is claimed as new and is desired to secure by Letters Patent of the United States is:

1. A bonded commutator comprising:
   a cylindrical base member, a coating of alumina on the cylindrical outer surface of said base member, a plurality of metallic, electrically conductive commutating segments circumferentially spaced about said coating, and a layer of high temperature resistant adhesive material interposed between each of said segments and said coating to bond said base member and said segments into an integral assembly, said adhesive material being electrically non-conductive and having high dielectric strength, the diameter of said base member being at least one hundred times greater than the thickness of said layer of adhesive material.

2. A bonded commutator as defined by claim 1 wherein said adhesive material is selected from the group of adhesives consisting of epoxies and polyimides.

3. A bonded commutator as defined by claim 2 wherein the diameter of said base member is at least 2.000 inches and the thickness of said adhesive layer is in the range of 0.020 inch or less.

4. A bonded commutator as defined by claim 2 wherein the thickness of said adhesive layer is within the range of 0.001 to 0.020 inch.

5. A bonded commutator comprising:
   a base member having a cylindrical outer surface, a plurality of metallic, electrically conductive commutating segments circumferentially spaced about said outer surface, a layer of high temperature resistant adhesive material interposed between each of said segments and said outer surface to bond said base member and said segments into an integral assembly, said adhesive material being electrically non-conductive and having high dielectric strength, said adhesive material being selected from the group of adhesives consisting of epoxies and polyimides, and spacing means disposed in said layer of adhesive material for establishing a minimum thickness of said adhesive layer.

6. A bonded commutator as defined by claim 5 in which said spacing means comprises glass beads of substantially uniform size, the diameter of said base member being at least 2.000 inches and the thickness of said adhesive layer being in the range of 0.001 to 0.020 inch.

7. A bonded commutator as defined by claim 2 in which said base member is comprised of steel.

8. A bonded commutator as defined by claim 7 in which said commutating segments are comprised of copper and in which said steel base member has a diameter of at least 2.000 inches and in which the thickness of said adhesive layer is in the range of 0.001 to 0.020 inch.

9. A bonded commutator as defined by claim 7 in which said commutating segments are comprised of aluminum and in which said steel base member has a diameter of at least 2.000 inches and in which the thickness of said adhesive layer is in the range of 0.001 to 0.020 inch.

10. A bonded commutator as defined by claim 7 further comprising spacing means disposed in said layer of adhesive material for establishing a minimum thickness of said adhesive layer consistent with suitable adhesive and strength and required electrical properties, the diameter of said base member being at least 2.000 inches and the thickness of said adhesive layer being in the range of 0.001 to 0.020 inch.

11. A commutator, as recited in claim 2, wherein said adhesive layer comprises a cured cycloaliphatic epoxide resin.

12. A commutator, as recited in claim 11, wherein said cycloaliphatic epoxide resin has been cured with a mixture of borontrifluoride monoethylamine and polyethylene glycol.

13. A commutator, as recited in claim 2 wherein said adhesive layer comprises a polyanhydride cured polyglycidol ether of bisphenol A.

14. A commutator, as recited in claim 2 wherein said adhesive layer is produced by heat-curing a mixture, compressively held between said base element and said commutation segments, said mixture comprising, by weight, 50–55 percent diglycidyl ether of bisphenol A having a viscosity of 10,000 to 16,000 centipoises at 25°C and having an epoxide equivalent weight of 185–192, and 40–50 percent pyromellitic dianhydride, exclusive of nonreactive fillers and pigments.

15. A commutator, as recited in claim 2 wherein said adhesive layer comprises a diaminodiphenylsulfone-cured polyglycidol ether of tetraphenyl ethane including 20–25 percent, by weight, based on the weight of cured resin, of fine aluminum powder.

16. A commutator, as recited in claim 2 wherein said adhesive layer is produced by heating a mixture, compressively held between said base element and said commutation segments, said mixture comprising, by weight, 55–60 percent polyglycidyl ether of tetraphenylene ethane having an epoxide equivalent weight of 210 to 240, approximately 20 percent diaminodiphenylsulfone, approximately 1 percent of a Lewis acid type catalyst, and 20–25 percent of fine aluminum powder.

17. A commutator, as recited in claim 16 wherein said Lewis acid type catalyst is borontrifluoride monoethylamine.

* * * * *